(12) United States Patent
Kairali et al.

(10) Patent No.: US 11,630,849 B2
(45) Date of Patent: Apr. 18, 2023

(54) OPTIMIZING INSIGHT GENERATION IN HETEROGENEOUS DATASETS

(71) Applicant: International Business Machines Corporation, Armonk, NY (US)

(72) Inventors: Sudheesh S. Kairali, Bangalore (IN); Ankur Tagra, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 18 days.

(21) Appl. No.: 16/796,996

(22) Filed: Feb. 21, 2020

(65) Prior Publication Data

US 2021/0263951 A1 Aug. 26, 2021

(51) Int. Cl.
*G06F 16/00* (2019.01)
*G06F 16/28* (2019.01)
*G06F 16/2457* (2019.01)
*G06F 16/26* (2019.01)

(52) U.S. Cl.
CPC ...... *G06F 16/283* (2019.01); *G06F 16/24578* (2019.01); *G06F 16/26* (2019.01); *G06F 2216/03* (2013.01)

(58) Field of Classification Search
CPC .. G06F 16/283; G06F 16/26; G06F 16/24578; G06F 2216/03
USPC ................................................. 707/600–899
See application file for complete search history.

(56) References Cited

U.S. PATENT DOCUMENTS

| | | | |
|---|---|---|---|
| 8,812,274 B2 | 8/2014 | Virkar | |
| 2007/0150800 A1* | 6/2007 | Betz | G06F 16/951 707/E17.108 |
| 2009/0006490 A1* | 1/2009 | Hunt | G06Q 30/02 |
| 2014/0258311 A1 | 9/2014 | Hamborg et al. | |
| 2017/0098002 A1 | 4/2017 | Byrnes et al. | |
| 2018/0075104 A1* | 3/2018 | Oberbreckling | G06F 16/254 |
| 2018/0357276 A1 | 12/2018 | Ding et al. | |

* cited by examiner

*Primary Examiner* — Irete F Ehichioya
*Assistant Examiner* — Shirley D Hicks
(74) *Attorney, Agent, or Firm* — Lieberman & Brandsdorfer, LLC

(57) ABSTRACT

Embodiments relate to a system, computer program product, and method to merge two or more heterogeneous datasets. Seed attributes of each dataset that is the subject of the merge are identified. The seed attributes are derived from candidate attributes of the respective datasets. A correlation is assessed to create a set of mergeable attributes and a set of non-mergeable attributes. A cohesiveness characteristic is leveraged to iteratively identify one or more attributes from the set of non-mergeable attributes, and to amend the set of mergeable attributes with the one or more attributes identified in the set of non-mergeable attributes. A merged dataset based on the amended set of mergeable attributes and representing non-trivial similarities between the first and second dataset is formed as output.

20 Claims, 6 Drawing Sheets

OPTIMIZING INSIGHT GENERATION IN HETEROGENEOUS DATASETS

BACKGROUND

The embodiments relate to establishing relationships between heterogeneous datasets. More specifically, the embodiments relate to merging heterogeneous datasets by selectively introducing attributes to a merged dataset, while establishing cohesiveness between the merged datasets by performing incremental dimensional analysis with respect to data cohesiveness across the heterogenous datasets.

A dataset is considered homogeneous if it is made up of data or data categories that are the same or similar. Similarly, a dataset is considered heterogeneous if it is made up of data or data categories that are dissimilar. Data within a dataset may be comprised of multi-dimensional data, which is data relating to more than two dimensions (or attributes). As datasets grow, it is understood in the art that the dimensions, also referred to herein as attributes, that comprise the dataset may increase. In a related manner, it is understood that needs arise for various reasons to merge datasets. For example, problem solving may identify data in multiple locations that would benefit from being combined to a single location. With respect to multi-dimensional data, merging such data is challenging in that data lying in various repositories may have various properties embedded in different dimensions. At the same time, part of the value of a dataset is for the data therein to be searchable so that queries may be performed on the dataset with meaningful results.

It is understood that there are different tools and methods for merging datasets. However, merging or integrating multi-dimensional heterogeneous datasets is challenging with respect to maintaining relativeness and cohesiveness of data. Cohesiveness may be individually maintainable, but after merging datasets and introducing new dimensions, the data cohesiveness has been known to deteriorate.

SUMMARY

The embodiments include a system, a computer program product, and a method for merging two or more heterogeneous datasets.

In one aspect, the system is configured with a process operatively coupled to memory, and a knowledge engine in communication with the processor. The knowledge engine is populated with tools in the form of an attribute manager, a correlation manager, and a merge manager, to support the merge of the datasets. The attribute manager functions to identify first seed attributes of a first dataset and second seed attributes of a second dataset. The first and second seed attributes represent an identifiable relationship between the respective datasets. The first seed attributes are derived from candidate attributes of the first dataset, and the second seed attributes are derived from candidate attributes of the second dataset. The correlation manager functions to compute a correlation using first data elements of the identified first seed attributes and second data elements of the identified second seed attributes, and uses the correlations to create a set of mergeable attributes and a set of non-mergeable attributes. The merge manager functions to leverage a cohesiveness characteristic to iteratively identify one or more attributes from the set of non-mergeable attributes, and to amend the set of mergeable attributes with the one or more attributes identified in the set of non-mergeable attributes. A merged dataset representing non-trivial similarities between the first and second datasets is formed as output. The merged dataset is based on the amended set of mergeable attributes.

In another aspect, a computer program product is provided to merge two or more heterogeneous datasets. Program code is provided to identify first seed attributes of a first dataset and second seed attributes of a second dataset. The first and second seed attributes represent an identifiable relationship between the respective datasets. The first seed attributes are derived from candidate attributes of the first dataset, and the second seed attributes are derived from candidate attributes of the second dataset. Program code is provided to compute a correlation using first data elements of the identified first seed attributes and second data elements of the identified second seed attributes, and use the correlations to create a set of mergeable attributes and a set of non-mergeable attributes. Program code is further provided to leverage a cohesiveness characteristic to iteratively identify one or more attributes from the set of non-mergeable attributes, and to amend the set of mergeable attributes with the one or more attributes identified in the set of non-mergeable attributes. A merged dataset representing non-trivial similarities between the first and second datasets is formed as output. The merged dataset is based on the amended set of mergeable attributes.

In yet another aspect, a computer-implemented method is provided to merge two or more heterogeneous datasets. First seed attributes of a first dataset and second seed attributes of a second dataset are identified. The first and second seed attributes represent an identifiable relationship between the respective datasets. The first seed attributes are derived from candidate attributes of the first dataset, and the second seed attributes are derived from candidate attributes of the second dataset. A correlation using first data elements of the identified first seed attributes and second data elements of the identified second seed attributes is assessed and utilized to create a set of mergeable attributes and a set of non-mergeable attributes. A cohesiveness characteristic is leveraged to iteratively identify one or more attributes from the set of non-mergeable attributes, and to amend the set of mergeable attributes with the one or more attributes identified in the set of non-mergeable attributes. A merged dataset representing non-trivial similarities between the first and second datasets is formed as output. The merged dataset is based on the amended set of mergeable attributes.

These and other features and advantages will become apparent from the following detailed description of the exemplary embodiment(s), taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments, and not of all embodiments unless otherwise explicitly indicated.

DETAILED DESCRIPTION

Figure 1:
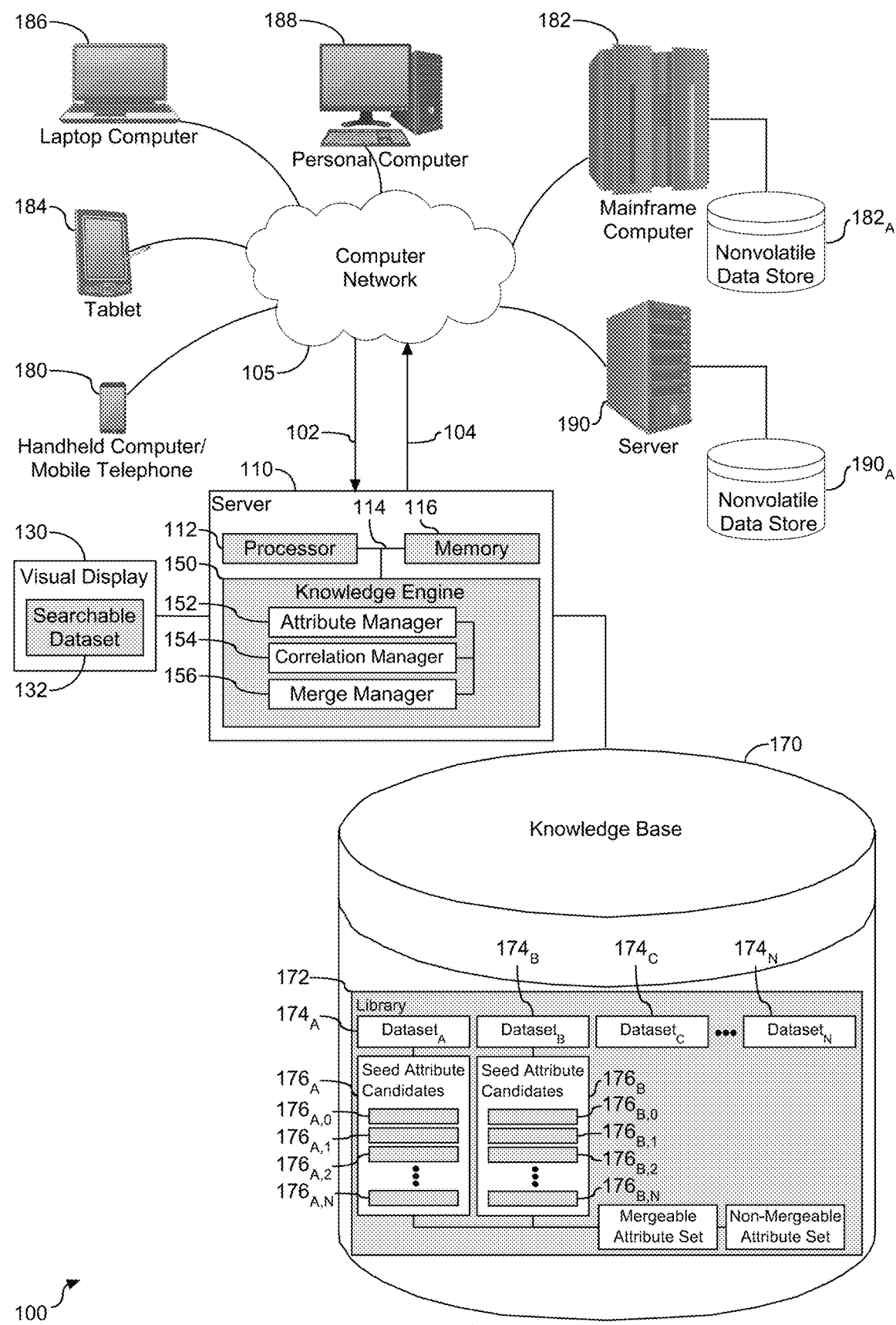
FIG. 1 depicts a block diagram illustrating a computer system with a knowledge engine to support and enable functionality directed at merging two or more heterogeneous multi-dimensional datasets.

It will be readily understood that the components of the present embodiments, as generally described and illustrated in the Figures herein, may be arranged and designed in a wide variety of different configurations. Thus, the following detailed description of the embodiments of the apparatus, system, and method, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least an embodiment of the present embodiments. Thus, appearances of the phrases "a select embodiment," "in one embodiment," or "in an embodiment" in various places throughout this specification are not necessarily referring to the same embodiment. The various embodiments may be combined with one another.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments.

Multi-dimensional data is a typical and prevalent type of data for analysis tasks, such as business intelligence analysis. Embodiments disclosed herein provide techniques to programmatically determine and explain insights from multi-dimensional datasets. It is understood that some similarities or correlations between any two multi-dimensional heterogeneous datasets may be apparent and human readable, while other similarities or correlations are not readily readable or apparent. The latter are referred to herein as insights. As shown and described herein, these insights are efficiently derived between any two or more multi-dimensional datasets through incremental dimensional analysis. More specifically, and as shown and described herein, cohesiveness between the datasets participating in a merging process is established. At the conclusion of the merging process, a merged and searchable dataset is formed representing similarities between the datasets, and based on which non trivial insights are generated.

The embodiments described herein and demonstrated in the drawing figures are directed at a computer system, a method, and a computer program product that effectively and efficiently merge two or more heterogeneous multi-dimensional datasets. Specifically, the merge introduces a minimal quantity of dimensions while maintaining relative cohesiveness. In an embodiment, and as described herein, multi-dimensional data is data organized in a tabular format, such as a multi-dimensional table that includes a set of records or data elements organized as rows in the table, and each record or data element is represented by a set of properties or attributes as columns in the table.

Merging apparent or visible dimensions or attributes of datasets is trivial, and may be conducted manually. However, merging non-apparent dimensions or attributes into a formed dataset is complex and challenging. As shown and described herein, the goal is to identify such dimensions while maintaining cohesiveness in the merged dataset, as well as maintaining cohesiveness in the non-merged dataset(s). Referring to FIG. 1, a block diagram of a computer system (100) to merge two or more heterogeneous multi-dimensional datasets is depicted. As shown, a server (110) is provided in communication with a plurality of computing devices (180), (182), (184), (186), (188), and (190) across a network connection (105). The server (110) is configured with a processing unit (112), e.g. one or more processors, in communication with memory (116) across a bus (114). The server (110) is shown with a knowledge engine (150) to support the functionality of merging two or more heterogeneous multi-dimensional datasets to form a cohesive merged dataset. The merged dataset is a searchable dataset that may be communicated over the network (105) from one or more of the computing devices (180), (182), (184), (186), (188), and (190) or may be retained in a corresponding knowledge base and accessible by one or more of the computing devices (180), (182), (184), (186), (188), and (190) to support a query. The computing devices (180), (182), (184), (186), (188), and (190) communicate with each other and with other devices or components via one or more wired and/or wireless data communication links, where each communication link may comprise one or more of wires, routers, switches, transmitters, receivers, or the like. In this networked arrangement, the server (110) and the network connection (105) enable communication detection, recognition, and resolution. Other embodiments of the server (110) may be used with components, systems, subsystems, and/or devices other than those that are depicted herein.

The knowledge engine (150) is shown herein configured with tools in the form of an attribute manager (152), a correlation manager (154), and a merge manager (156). The tools function to develop the formation of the merged dataset to form a cohesive dataset with a minimal quantity of attributes so that the merged dataset represents strong cohesions among the attributes while minimizing crowding of the represented attributes. The knowledge engine (150) may receive input from the network (105) and leverage a data source (170), also referred to herein as a corpus or knowledge base, to selectively access multi-dimensional datasets. As shown the data source (170) is configured with a library (172) with datasets stored therein. Although only one library is shown, in an embodiment, the data source (170) may be configured with multiple libraries. The library (172) is shown with a plurality of datasets, including $dataset_A$ ($174_A$), $dataset_B$ ($174_B$), $dataset_C$ ($174_C$), . . . , $dataset_N$ ($174_N$). The quantity of datasets shown is for illustrative purposes and should not be considered limiting. The datasets shown and described herein are directed at multi-dimensional datasets, with each dataset including at least two dimensions. Accordingly, the data source stores one or more datasets in corresponding libraries of the data source (170).

The merged dataset formed herein is a searchable dataset. The goal of merging two or more datasets is to support efficient and effective data processing while maintaining relativeness of the datasets. Once the datasets that are the subject of the merge have been preliminary identified, the attribute manager (152) functions to identify seed attributes (from attribute candidates) in each of the respective datasets that share an identifiable relationship. In an embodiment, the seed attributes are similar or comparable dimensions that are manually identifiable, e.g., the preliminary relationship is apparent. The seed attributes of the first dataset are referred to herein as first seed attributes, and seed attributes of the second dataset are referred to herein as second seed attributes. In an embodiment, the datasets from which the seed attributes are identified are non-sequential datasets. As shown herein, a first dataset, dataset$_A$ ($174_A$), is shown with first seed attribute candidates ($176_{A,0}$), ($176_{A,1}$), ($176_{A,2}$), ... ($176_{A,N}$) and a second dataset, dataset$_B$ ($174_B$), is shown with second seed attribute candidates ($176_{B,0}$), ($176_{B,1}$), ($176_{B,2}$), ($176_{B,N}$). In an embodiment, the first and second datasets, ($174_A$) and ($174_B$), respectively, are non-sequential datasets. Seeds attributes are derived from each of the attribute candidates in one or more of the datasets. Based on the example shown herein, the attribute manager (152) identifies seed attributes from each of the set of attribute candidates. For example, in an embodiment, the first seed attributes identified by the attribute manager (152) include attributes ($176_{A,0}$) and ($176_{A,2}$), and the second seed attributes identified by the attribute manager (152) include attributes ($176_{B,1}$) and ($176_{B,2}$), e.g., attribute ($176_{A,0}$) correlates with attribute ($176_{B,1}$) and attribute ($176_{A,2}$) correlates with attribute ($176_{B,2}$). Accordingly, as shown herein, the attribute manager (152) functions to identify seed attributes from attribute candidates of two or more datasets.

As shown and described herein, the process of merging the heterogeneous datasets includes identification of seed attributes, e.g., human readable attributes, and non-human readable attributes, referred to herein as attributes. It is understood that "attributes" as defined herein are separate attributes from those that are defined as seed attributes. The non-human readable attributes, e.g. attributes, are identifiable by plotting the datasets to an nth dimension, referred to herein as insights. Such insights can be and are derived by incremental dimensional analysis of any dissimilar datasets, e.g. dataset$_A$ ($174_A$) and dataset$_B$ ($174_B$). Accordingly, and as demonstrated herein, the first and second datasets are merged to form a merged dataset, with the merge or process of merging initially based on or limited to the seed dimensions, and then following by introducing the insights to the merged dataset so that the relativeness of the datasets remains intact and information processing is enhanced with respect to efficiency and effectiveness.

The correlation manager (154) is shown herein operatively coupled to the attribute manager (152). The correlation manager (154) computes a correlation using seed data elements from the first dataset, e.g. dataset$_A$ ($174_A$), and seed data elements from the second, e.g. dataset$_B$ ($174_B$). More specifically, and as shown herein, the correlation is computed based on the identified seed attributes of the respective datasets. Based on the example herein, the correlation is computed using the first seed attributes ($176_{A,0}$) and ($176_{A,2}$), and the second seed attributes ($176_{B,1}$) and ($176_{B,2}$). The computation creates two sets of attributes, including a set of mergeable attributes ($178_A$) and a second of non-mergeable attributes ($178_B$).

The merge manager (156) is shown herein operatively coupled to the correlation manager (154). The merge manager (156) leverages the attribute sets created by the correlation manager (154). More specifically, the merge manager (156) iteratively identifies one or more attributes from the set of non-mergeable attributes ($178_B$), and uses these identified attributes to amend the set of mergeable attributes ($178_A$), with the amendment based on a cohesiveness characteristic, a statistical calculation that is used to examine a relationship between two sets of data. Details of the cohesiveness characteristic and corresponding calculation are shown and described in FIG. 3. As attributes from the set of non-mergeable attributes ($178_B$) are selectively identified by the merge manager (156) using the cohesiveness characteristic and calculation, the set of mergeable attributes ($178_A$) is amended with this identified attributes, so that the amended set of mergeable attributes ($178_A$) represents non-trivial similarities between the first and second datasets ($174_A$) and ($174_B$). As the identified attributes are amended and effectively populated into the set of mergeable attributes ($178_A$), these identified attributes are removed from the set of non-mergeable attributes ($178_B$). The cohesiveness characteristic assessed or computed by the correlation manager (154) incorporates a silhouette score, including a first silhouette score and a second silhouette score. Each of the corresponding silhouette scores represents a distance of individual data to all other values in the set and is used to characterize and understand data density of the dataset. The silhouette value is a measure of how similar an object is in its own cluster, cohesion, compared to other clusters, separation. The cohesiveness assessment includes a first cohesiveness, referred to herein as cohesiveness$_A$, which is the silhouette score of data elements in the first dataset ($174_A$) when the elements of the second dataset ($174_B$) are ignored, and a second cohesiveness, referred to herein as cohesiveness$_B$, which is the silhouette score of data elements in the second dataset ($174_B$) when the elements of the first dataset$_A$ ($174_A$) are ignored. Accordingly, the correlation manager (154) utilizes the respective silhouette scores to represent data cohesions in the corresponding first and second datasets.

The merge manager (156) selectively and effectively amends a set of mergeable attributes ($178_A$) with selectively identified attributes from the set of non-mergeable attributes ($178_B$). Once amended, the correlation manager (154) re-computes the first and second silhouette scores of the first and second datasets ($174_A$) and ($174_B$), respectively. Accordingly, the correlation manager (154) conducts the assessment of the identified attributes, and the merge manager (156) conducts the amendment of the set of mergeable attributes ($178_A$) based on the assessment. In an embodiment, the amendment of the set of mergeable attributes ($178_A$) is conducted iteratively, and is referred to herein as an iterative amendment. As shown herein, the correlation manager (154) and the merge manager (156) interface with respect to the iterative amendment. The merge manager (156) concludes the iterative amendment of the set of mergeable attributes ($178_A$) when a combined silhouette score attains, e.g. meets, a mean of the first and second silhouette scores. The iterative amendment of the set of mergeable attributes ($178_A$) together with the assessment conducted by the correlation manager (154) introduces a minimal quantity of attributes to the set of mergeable attributes ($178_A$) while at the same time maintaining cohesiveness of the first and second datasets ($174_A$) and ($174_B$), respectively. Once the set of mergeable attributes ($178_A$) is formed, the merge manager (176) leverages the set of mergeable attributes ($178_A$) to form a searchable dataset (132) as a representation of similarities of the identified mergeable attributes of the first and second datasets ($174_A$) and ($174_B$), respectively. The searchable dataset (132) may be presented as output on a visual display (130), or if may be communicated to one or more computing devices (180), (182), (184), (186), and (190) across the network (105).

The network (105) may include local network connections and remote connections in various embodiments, such that the knowledge engine (150) may operate in environments of any size, including local and global, e.g., the Internet. The knowledge engine (150) serves as a front-end system that can make available a variety of knowledge extracted from or represented in datasets.

In some illustrative embodiments, the server (110) may be the IBM Watson® system available from International Business Machines Corporation of Armonk, N.Y., is augmented with the mechanisms of the illustrative embodiments described hereafter. The IBM Watson® system receives electronic communication as the input content (102) which it then subjects to processing through the knowledge engine (150) and corresponding tools (152)-(156). The attribute manager (152), correlation manager (154), and merge manager (156), hereinafter referred to collectively as knowledge engine tools, e.g. tools, are shown as being embodied in or integrated within the knowledge engine (150) of the server (110). The tools (152), (154), and (156) may be implemented in a separate computing system (e.g., 190) that is connected across network (105) to the server (110). Wherever embodied, the tools (152), (154), and (156) function to iteratively and selectively identify mergeable attributes to represent non-trivial similarities between or among datasets, and to create a merged dataset (132) as a searchable dataset and based on the mergeable attributes.

Types of information handling systems that can utilize the knowledge engine (150) range from small handheld devices, such as a handheld computer/mobile telephone (180) to large mainframe systems, such as a mainframe computer (182). Examples of a handheld computer (180) include personal digital assistants (PDAs), personal entertainment devices, such as MP4 players, portable televisions, and compact disc players. Other examples of information handling systems include a pen or tablet computer (184), a laptop or notebook computer (186), a personal computer system (188), and a server (190). As shown, the various information handling systems can be networked together using the computer network (105). Types of computer networks (105) that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores (e.g., the server (190) utilizes nonvolatile data store ($190_A$), and the mainframe computer (182) utilizes nonvolatile data store ($182_A$). The nonvolatile data store ($182_A$) can be a component that is external to the various information handling systems or can be internal to one of the information handling systems.

An information handling system employed to support the knowledge engine (150) may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 2:
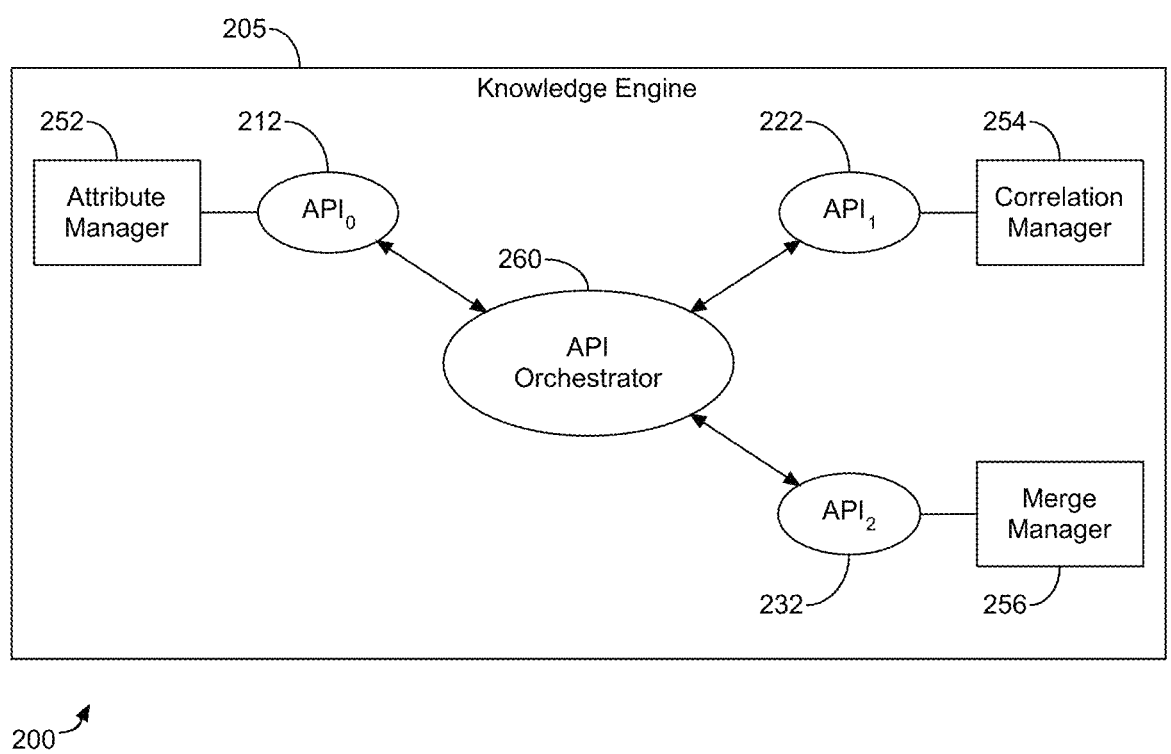
FIG. 2 depicts a block diagram illustrating knowledge engine tools, as shown and described in FIG. 1, and their associated application program interfaces.

An Application Program Interface (API) is understood in the art as a software intermediary between two or more applications. With respect to the knowledge engine (150) shown and described in FIG. 1, one or more APIs may be utilized to support one or more of the tools (152), (154), and (156) and their associated functionality. Referring to FIG. 2, a block diagram (200) is provided illustrating the tools (152), (154), and (156) and their associated APIs. As shown, a plurality of tools are embedded within the knowledge engine (205), with the tools including the attribute manager (252) associated with API₀ (212), the correlation manager (254) associated with $API_1$ (222), and the merge manager (256) associated with $API_2$ (232). Each of the APIs may be implemented in one or more languages and interface specifications. $API_0$ (212) provides functional support to identify seed attributes of the corresponding datasets that are the subject of the merge; $API_1$ (222) provides functional support to conduct the correlation assessments and to create the set of mergeable attributes and the set of non-mergeable attributes; and $API_2$ (232) provides functional support to iteratively identify attributes from the set of non-mergeable attributes and selectively amend the set of mergeable attributes with these identified attributes, and to form a merged dataset based on the amended set of mergeable attributes, with the merged dataset being a representation of non-trivial similarities between the corresponding datasets.

As shown, each of the APIs (212), (222), and (232) are operatively coupled to an API orchestrator (260), otherwise known as an orchestration layer, which is understood in the art to function as an abstraction layer to transparently thread together the separate APIs. In an embodiment, the functionality of the separate APIs may be joined or combined. As such, the configuration of the APIs shown herein should not be considered limiting. Accordingly, as shown herein, the functionality of the tools may be embodied or supported by their respective APIs.

Figure 3:
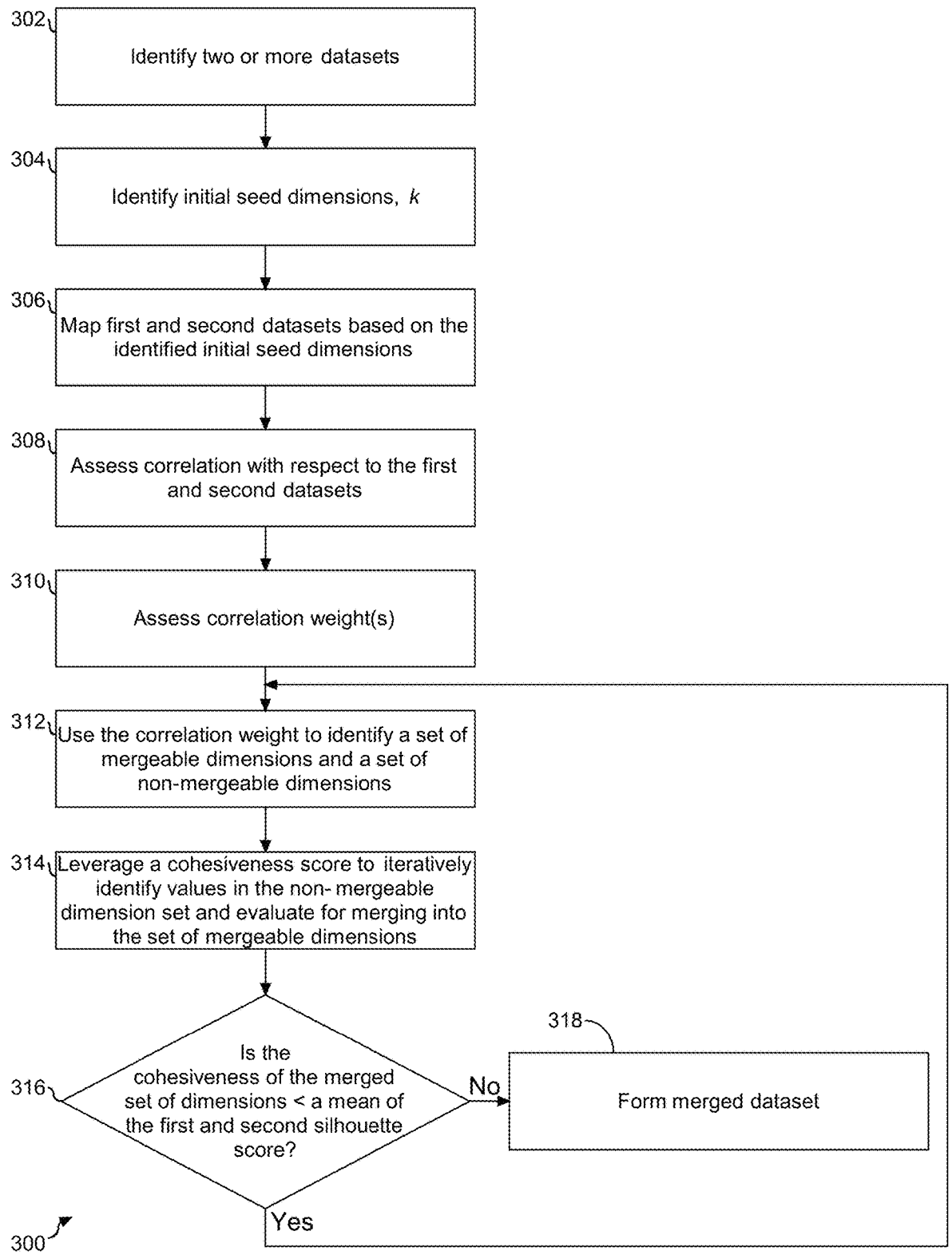
FIG. 3 depicts a flow chart illustrating a process for merging two or more multi-dimensional heterogeneous datasets to create a searchable merged dataset representing non-trivial insights between the datasets.

Referring to FIG. 3, a flow chart (300) is provided illustrating a process for merging two or more multi-dimensional heterogeneous datasets to create a searchable merged dataset representing insights between the datasets. The datasets that are the subject of the merge are identified (302). It is understood that at a minimum two datasets are identified at step (302), and in an embodiment more than two datasets may be identified. For multi-dimensional datasets that are arranged in tables, the dimensions are features or attributes of the data and are identified as columns of the table. Similarly, when representing multi-dimensional datasets in a table, a higher dimensional plane refers to one or more additional columns added to the table. For ease of description, the merge will be demonstrated with two datasets, referred to herein as a first dataset and a second dataset, respectively. Various techniques may be utilized to identify the datasets that are the subject of the merge. Following the identification at step (302), an initial quantity of seed dimensions, e.g. k seed dimensions, within the first and second datasets are identified (304). The seed dimensions are identifiable correlations, e.g. manually or humanly identifiable correlations, between or across the dimensions of the first and second datasets, e.g. co-relational dimensions, and in an embodiment are overlapping dimensions between the first and second datasets. For example, in an embodiment, the seed dimensions may be similar or comparable dimensions as represented in columns of corresponding tables, e.g. name, entity, address, etc. The seed dimensions identified at step (304) are apparent or visible, and in an embodiment are identified via manual intervention. Accordingly, the initial aspect of the dataset merge is directed at seed dimension identification between or across the multi-dimensional datasets.

The seed dimensions, e.g. k seed dimensions, identified at step (304) are used to sort the datasets. More specifically, the first and second datasets are mapped and sorted based on the seed dimensions (306). In an embodiment, various sorting mechanisms may be utilized at step (306), and in an embodiment the sorting mechanism may depend on the data type. A correlation coefficient is a statistical calculation that is used to examine a relationship between dimensions of two sets of data. The following formula can be used to find the correlation coefficient, r:

$$r_{xy} = \frac{\sum_{i=1}^{n}(x_i - \bar{x})(y_i - \bar{y})}{\sqrt{\sum_{i=1}^{n}(x_i - \bar{x})^2} \sqrt{\sum_{i=1}^{n}(y_i - \bar{y})^2}}$$

where $x_i$ and $y_i$ are individual sample points indexed with i.

The value of the correlation coefficient indicates the strength and nature of the relationship. Correlation coefficient values range between −1.00 to +1.00, where correlation coefficient indicates the strength of correlation between any two columns of the datasets under consideration, e.g. $dataset_A$ and $dataset_B$. If the value is exactly +1.00, it means that there is a perfect, e.g. strong, positive relationship between the two values being assessed. Whereas, a value of exactly −1.00 means a perfect negative, e.g. inverse, relationship between the two values being assessed. A value of exactly 0.00 means a weak or no correlation. Most correlation coefficient values lie somewhere between these two values, e.g. between +1.00 and −1.00. Following the sorting at step (306), the correlation is assessed with respect to the first and second datasets (308), where every dimension in the first dataset is correlated with every dimension in the second dataset. For example, if the first dataset, $dataset_A$, is represented by dimensions a-k, and the second dataset, $dataset_B$, is represented by dimensions b-k, the dimension A(a) is correlated with B(b), B(c), . . . , B(k), then dimension A(b) is correlated with B(b), B(c), . . . , B(k), and continues for a total of 110 correlations, e.g., eleven dimensions of $dataset_A$ and ten dimensions of $dataset_B$. Accordingly, based on this example, the total correlations calculated at step (308) are represented as the product of the number of dimensions in $dataset_A$ and the number of dimensions in $dataset_B$.

Using the correlations assessed at step (308), a weight of a correlation with respect to each combination of dimensions from $dataset_A$ and $dataset_B$ is assessed (310) as:

$$w_{i,j} = \frac{c_{i,j}}{\sum C}$$

where $\Sigma C$ is a sum of all of the correlations between the datasets being assessed, i.e., sum of all of the correlations between $dataset_A$ and $dataset_B$ calculated at step (308), and $c_{i,j}$ is a correlation between a dimension in $dataset_A$ and a dimension in $dataset_B$, where i is a dimension counting variable in $dataset_A$ and j is a dimension counting variable in $dataset_B$. The weight of a correlation, represented as $w_{i,j}$, representing the weight between any of the dimensions in $dataset_A$ and any of the dimensions in $dataset_B$. The weights generated at step (310) are used to identify a set of mergeable dimensions and a set of non-mergeable dimensions (312). The following pseudo code demonstrates an algorithm for identifying the two sets of dimensions, e.g. mergeable and non-mergeable:

1. For each i (a-k); take each dimension in $dataset_A$
2. For each j (b-k); take each dimension in $dataset_B$
3. $c_{i,j}$=compute_correlation (i,j); compute correlation
4. 
$$w_{a_i b_i} = \frac{c_{i,j}}{\sum C};$$

5. $W=\{w_{a_i b_i}\}$; assign all the weights $w_{a_i b_i}$ to the set of mergeable dimensions W
6. For every $\{w_{a_i b_i}\} < \lambda$, $W=W-\{w_{a_i b_i}\}$; remove the weight of every mergeable dimension, $w_{a_i b_i}$, in the set of mergeable dimensions, W, that is below a threshold $\lambda$;
7. For every $a_i$ not in W, non_mergeable=non_mergeable+$\{a_i\}$; assign each dimension from $dataset_A$ removed from set W to a set of non-mergeable dimensions
8. For every $b_j$ not in W, non_mergeable=non_mergeable+$\{b_j\}$; assign each dimension removed from $dataset_B$ removed from set W to the set of non-mergeable dimensions.

The threshold $\lambda$ is statistically determined, and alternatively in an embodiment $\lambda$ may be selected based on subject and choice. Arriving at the threshold $\lambda$ depends on the datasets and the type of insights being sought or generated. Accordingly, correlation weights are utilized to create both a set of mergeable dimensions and a set of non-mergeable dimensions between the datasets being evaluated.

Datasets are merged based on the dimensions in the set of mergeable dimensions W and the dimensions in the set of non-mergeable dimensions. It is understood that the dimensions represented in the set of mergeable dimensions may become crowded. Following step (310), a cohesiveness score is leveraged to iteratively identify dimensions in the set of non-mergeable dimensions to be evaluated for merging into the set of mergeable dimension (312). Cohesiveness represents validation of consistency of dimensions within the corresponding set. After the set of mergeable dimensions is amended, the cohesiveness scores of the respective datasets, e.g. $dataset_A$ and $dataset_B$, and the merged dimensions, are separately assessed (314). Each cohesiveness assessment leverages a silhouette score, with the silhouette score representing a distance of individual data from all other values in the set and is used to characterize and understand data density of the respective dataset. The silhouette values is a measure of how similar an object is in its own cluster, cohesion, compared to other clusters, separation. The cohesiveness assessment includes the $cohesiveness_A$ which is the silhouette score of data elements in $dataset_A$ when the elements of dataset B are ignored, and $cohesiveness_B$ which is the silhouette score of data elements in $dataset_B$ when the elements of $dataset_A$ are ignored. It is then determined if the cohesiveness of the merged dataset of dimensions, W, is less than a mean of the first and second silhouette scores (316). A positive response to the determination at step (316) is followed by a returned to step (312), and a negative response concludes the selective amendment of the merged set of dimensions. Accordingly, the merged set of dimensions represents non-trivial attributes of the datasets subject to merge.

Following the negative response to the determination at step (316), a merged dataset is retrieved and formed from the datasets that are the subject of the merge (318) with the merged dataset representing data values from the datasets, i.e. the first and second datasets, having the attributes of the merged set of attributes, e.g. mergeable attributes. As demonstrated herein, a minimal quantity of attributes, e.g. dimensions, are selectively introduced to the merged set of dimensions while maintaining cohesiveness of the first and second datasets. The merged dataset formed at step (318) is a searchable dataset. In an embodiment, the dimensions added to the set of mergeable attributes should not be used individually to extract data to form the merged dataset. The term dataset used herein that is the subject of the merging may be any dataset or datasets. For example, in an embodiment, the process shown and described herein may be utilized to compare two different cloud service providers and to use insights generated by the comparison to merge corresponding datasets while preserving cohesiveness.

Aspects of the functional tools (152), (154), and (156) and their associated functionality may be embodied in a computer system/server in a single location, or in an embodiment, may be configured in a cloud based system sharing computing resources. With references to FIG. 4, a block diagram (400) is provided illustrating an example of a computer system/server (402), hereinafter referred to as a host (402) in communication with a cloud based support system, to implement the system and process(es) described above with respect to FIGS. 1-3. Host (402) is operational with numerous other general purpose or special purpose computing system environments or configurations. Examples of well-known computing systems, environments, and/or configurations that may be suitable for use with host (402) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (402) may be described in the general context of computer system-executable instructions, such as program modules, being executed by a computer system. Generally, program modules may include routines, programs, objects, components, logic, data structures, and so on that perform particular tasks or implement particular abstract data types. Host (402) may be practiced in distributed cloud computing environments (410) where tasks are performed by remote processing devices that are linked through a communications network. In a distributed cloud computing environment, program modules may be located in both local and remote computer system storage media including memory storage devices.

Figure 4:
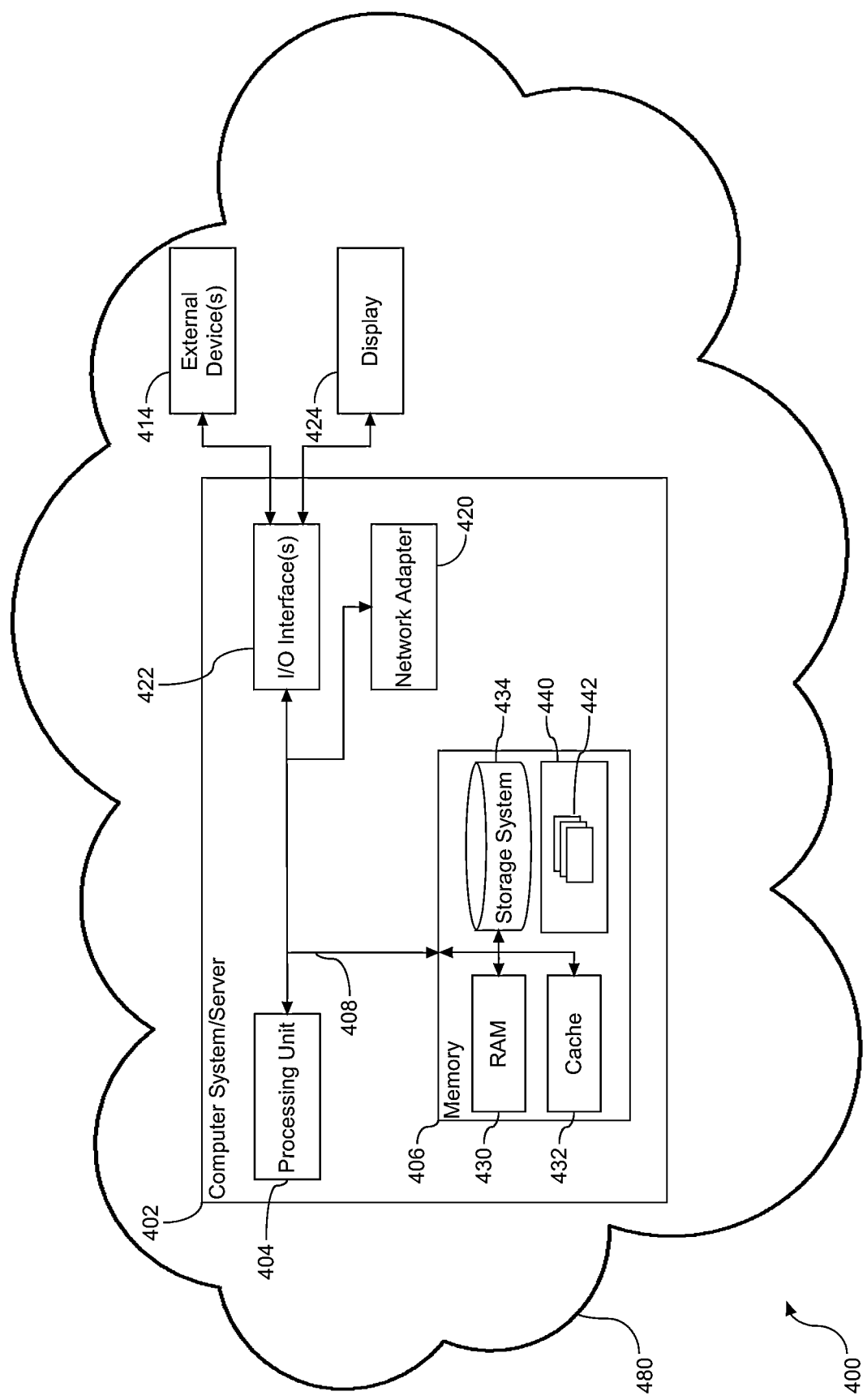
FIG. 4 depicts a block diagram of an example of a cloud computing node.

As shown in FIG. 4, host (402) is shown in the form of a general-purpose computing device. The components of host (402) may include, but are not limited to, one or more processors or processing units (404), e.g. hardware processors, a system memory (406), and a bus (408) that couples various system components including system memory (406) to processor (404). Bus (408) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (402) typically includes a variety of computer system readable media. Such media may be any available media that is accessible by host (402) and it includes both volatile and non-volatile media, removable and non-removable media.

Memory (406) can include computer system readable media in the form of volatile memory, such as random access memory (RAM) (430) and/or cache memory (432). By way of example only, storage system (434) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (408) by one or more data media interfaces.

Program/utility (440), having a set (at least one) of program modules (442), may be stored in memory (406) by way of example, and not limitation, as well as an operating system, one or more application programs, other program modules, and program data. Each of the operating systems, one or more application programs, other program modules, and program data or some combination thereof, may include an implementation of a networking environment. Program modules (442) generally carry out the functions and/or methodologies of embodiments to merge to or more heterogeneous dataset. For example, the set of program modules (442) may include the tools (152), (154), and (156) as described in FIG. 1.

Host (402) may also communicate with one or more external devices (414), such as a keyboard, a pointing device, etc.; a display (424); one or more devices that enable a user to interact with host (402); and/or any devices (e.g., network card, modem, etc.) that enable host (402) to communicate with one or more other computing devices. Such communication can occur via Input/Output (I/O) interface(s) (422). Still yet, host (402) can communicate with one or more networks such as a local area network (LAN), a general wide area network (WAN), and/or a public network (e.g., the Internet) via network adapter (420). As depicted, network adapter (420) communicates with the other components of host (402) via bus (408). In an embodiment, a plurality of nodes of a distributed file system (not shown) is in communication with the host (402) via the I/O interface (422) or via the network adapter (420). It should be understood that although not shown, other hardware and/or software components could be used in conjunction with host (402). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (406), including RAM (430), cache (432), and storage system (434), such as a removable storage drive and a hard disk installed in a hard disk drive.

Computer programs (also called computer control logic) are stored in memory (406). Computer programs may also be received via a communication interface, such as network adapter (420). Such computer programs, when run, enable the computer system to perform the features of the present embodiments as discussed herein. In particular, the computer programs, when run, enable the processing unit (404)

to perform the features of the computer system. Accordingly, such computer programs represent controllers of the computer system.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments.

In an embodiment, host (402) is a node of a cloud computing environment (610). As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 5:
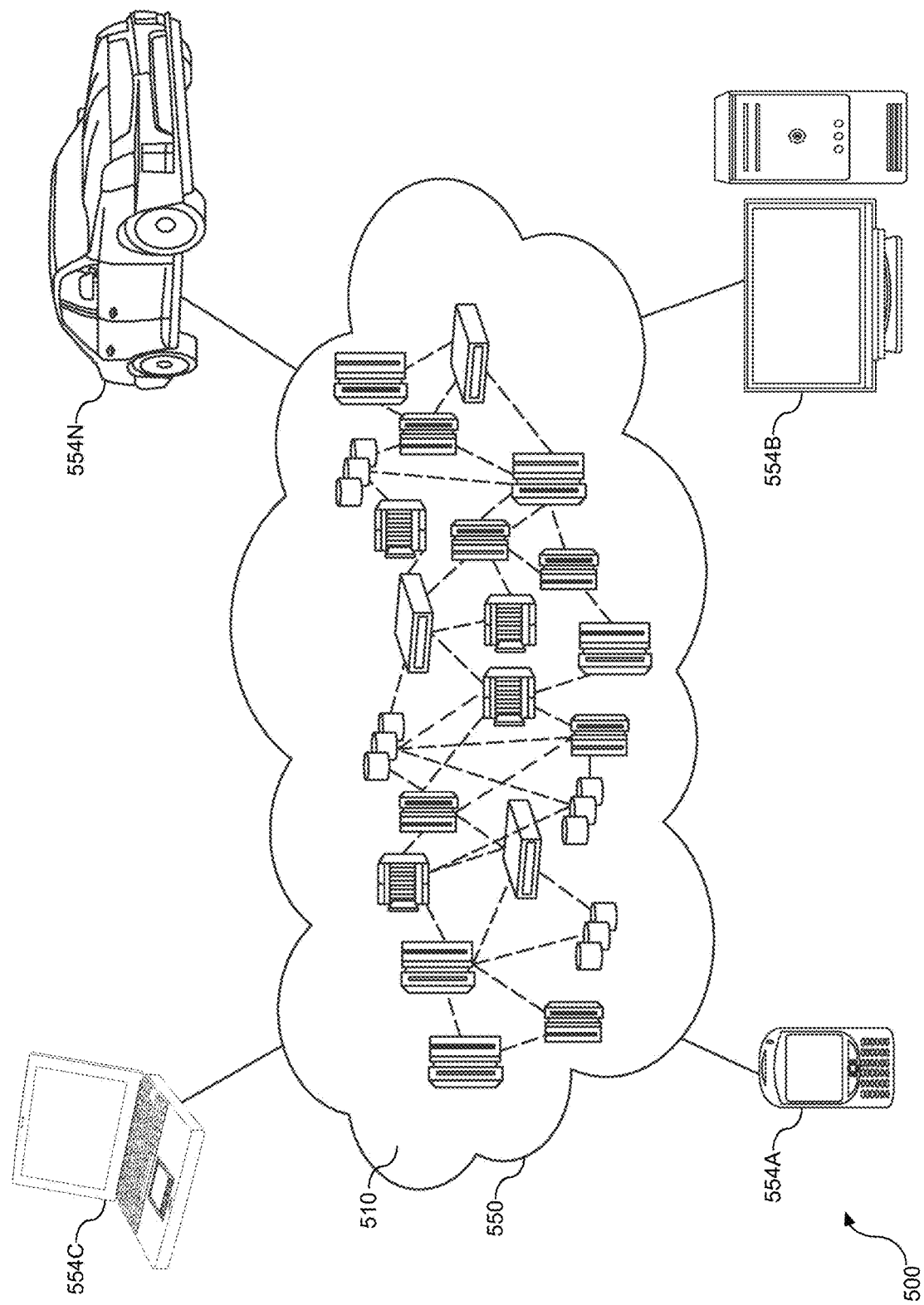
FIG. 5 depicts a block diagram illustrating a cloud computing environment.

Referring now to FIG. 5, an illustrative cloud computing network (500). As shown, cloud computing network (500) includes a cloud computing environment (550) having one or more cloud computing nodes (510) with which local computing devices used by cloud consumers may communicate. Examples of these local computing devices include, but are not limited to, personal digital assistant (PDA) or cellular telephone (554A), desktop computer (554B), laptop computer (554C), and/or automobile computer system (554N). Individual nodes within nodes (510) may further communicate with one another. They may be grouped (not shown) physically or virtually, in one or more networks, such as Private, Community, Public, or Hybrid clouds as described hereinabove, or a combination thereof. This allows cloud computing environment (500) to offer infrastructure, platforms and/or software as services for which a cloud consumer does not need to maintain resources on a local computing device. It is understood that the types of computing devices (554A-N) shown in FIG. 5 are intended to be illustrative only and that the cloud computing environment (550) can communicate with any type of computerized device over any type of network and/or network addressable connection (e.g., using a web browser).

Figure 6:
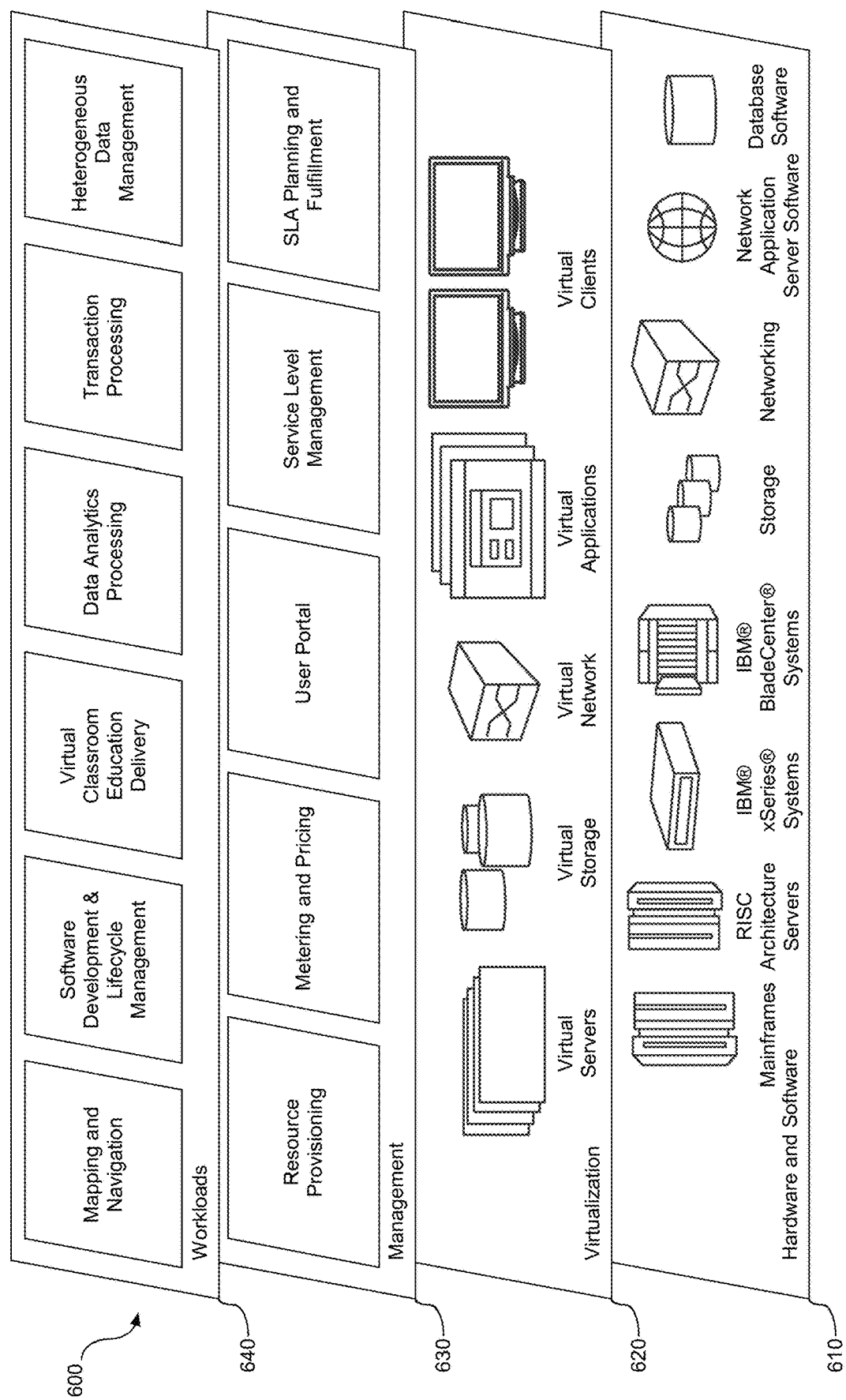
FIG. 6 depicts a block diagram illustrating a set of functional abstraction layers provided by the cloud computing environment shown in FIG. 5.

Referring now to FIG. 6, a set of functional abstraction layers (600) provided by the cloud computing network of FIG. 5 is shown. It should be understood in advance that the components, layers, and functions shown in FIG. 6 are intended to be illustrative only, and the embodiments are not limited thereto. As depicted, the following layers and corresponding functions are provided: hardware and software layer (610), virtualization layer (620), management layer (630), and workload layer (640).

The hardware and software layer (610) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (620) provides an abstraction layer from which the following examples of virtual entities may be provided: virtual servers; virtual storage; virtual networks, including virtual private networks; virtual applications and operating systems; and virtual clients.

In one example, management layer (630) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer (640) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and heterogeneous data management.

While particular embodiments of the present embodiments have been shown and described, it will be obvious to those skilled in the art that, based upon the teachings herein, changes and modifications may be made without departing from the embodiments and its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "one or more" or "at least one" and indefinite articles such as "a" or "an"; the same holds true for the use in the claims of definite articles.

The present embodiments may be a system, a method, and/or a computer program product. In addition, selected aspects of the present embodiments may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present embodiments may take the form of computer program product embodied in a computer readable storage medium (or media) having computer readable program instructions thereon for causing a processor to carry out aspects of the present embodiments. Thus embodied, the disclosed system, a method, and/or a computer program product are operative to improve the functionality and operation of an artificial intelligence platform, and more specifically to train a contrastive neural network in an active learning environment.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiments. Accordingly, the scope of protection of the embodiments is limited only by the following claims and their equivalents.

What is claimed is:

1. A computer system comprising:
a processor operatively coupled to memory; and
a knowledge engine, in communication with the processor, the knowledge engine having one or more tools to merge two or more heterogeneous datasets, the tools comprising:
an attribute manager configured to identify first seed attributes of a first non-sequential dataset and second seed attributes of a second non-sequential dataset that share an identifiable relationship with one another, the first seed attributes derived from the first dataset comprising a plurality of first seed attribute candidates presented as first dimensions of the first dataset, the second seed attributes derived from the second dataset comprising a plurality of second seed attribute candidates presented as second dimensions of the second dataset, the first and second dimensions comprising rows or columns;
a correlation manager configured to compute a correlation using first data elements of the identified first seed attributes and second data elements of the identified second seed attributes, including to compute a respective weight of the correlation for the first dimensions with respect to the second dimensions, and the correlation manager further configured to create a set of mergeable first and second dimensions based on the computed correlation weights and to create a set of non-mergeable first and second dimensions based on the computed correlation weights;
a merge manager configured to iteratively identify one or more attributes from the set of non-mergeable first and second dimensions, and to amend the created set of mergeable first and second dimensions with the identified one or more attributes from the set of non-mergeable first and second dimensions based on a cohesiveness characteristic; and
the merge manager configured to form a merged dataset as output as a representation including non-trivial similarities between the first and second datasets, the merged dataset based on the amended set of mergeable first and second dimensions.

2. The computer system of claim 1, wherein the cohesiveness characteristic incorporates a first silhouette score of the data elements of the first dataset and a second silhouette score of the data elements of the second dataset, and wherein the first silhouette score represents data cohesions in the first dataset and the second silhouette score represents data cohesions in the second dataset.

3. The computer system of claim 2, wherein the amendment of the set of mergeable first and second dimensions further comprises the correlation manager to re-compute the first silhouette score and the second silhouette score.

4. The computer system of claim 3, wherein the merge manager is further configured to conclude the iterative amendment of the set of mergeable first and second dimensions when a combined silhouette score attains a mean of the first and second silhouette scores.

5. The computer system of claim 1, wherein the amendment of the set of mergeable first and second dimensions by the merge manager includes the merge manager configured to add the identified one or more attributes from the set of non-mergeable first and second dimensions to the set of mergeable first and second dimensions created by the merge manager.

6. A computer program product to merge two or more datasets, the computer program product comprising:
   a computer readable storage medium having program code embodied therewith, the program code executable by a processor to:
      identify first seed attributes of a first non-sequential dataset and second seed attributes of a second non-sequential dataset that share an identifiable relationship with one another, the first and second datasets being heterogeneous with respect to one another, the first seed attributes derived from the first dataset comprising a plurality of first seed attribute candidates presented as first dimensions of the first dataset, the second seed attributes derived from the second dataset comprising a plurality of second seed attribute candidates presented as second dimensions of the second dataset, the first and second dimensions comprising rows or columns;
      compute a correlation using first data elements of the identified first seed attributes and second data elements of the identified second seed attributes, including to compute a respective weight of the correlation for the first dimensions with respect to the second dimensions, to create a set of mergeable first and second dimensions based on the computed correlation weights and to create a set of non-mergeable first and second dimensions based on the computed correlation weights;
      iteratively identify one or more attributes from the set of non-mergeable first and second dimensions and to amend the created set of mergeable first and second dimensions with the identified one or more attributes from the set of non-mergeable first and second dimensions based on a cohesiveness characteristic; and
      form a merged dataset as output as a representation of including non-trivial similarities between the first and second datasets, the merged dataset based on the amended set of mergeable first and second dimensions.

7. The computer program product of claim 6, wherein the cohesiveness characteristic incorporates a first silhouette score of the data elements of the first dataset and a second silhouette score of the data elements of the second dataset.

8. The computer program product of claim 7, wherein the first silhouette score represents data cohesions in the first dataset and the second silhouette score represents data cohesions in the second dataset.

9. The computer program product of claim 7, wherein the program code executable by the processor to amend the created set of mergeable first and second dimensions further comprises program code executable by the processor to re-compute the first silhouette score and the second silhouette score.

10. The computer program product of claim 9, further comprising program code executable by the processor to conclude the iterative amendment of the set of mergeable first and second dimensions when a combination of the first and second silhouette scores attains a mean of the first and second silhouette scores.

11. The computer program product of claim 6, wherein the amendment of the set of mergeable first and second dimensions includes program code executable by the processor to add the identified one or more attributes from the set of non-mergeable first and second dimensions to the created set of mergeable first and second dimensions.

12. A computer-implemented method for merging two or more datasets, comprising:
   identifying first seed attributes of a first non-sequential dataset and second seed attributes of a second non-sequential dataset that share an identifiable relationship with one another, the first and second datasets being heterogeneous with respect to one another, the first seed attributes derived from the first dataset comprising a plurality of first seed attribute candidates presented as first dimensions of the first dataset, the second seed attributes derived from the second dataset comprising a plurality of second seed attribute candidates presented as second dimensions of the second dataset, the first and second dimensions comprising rows or columns;
   computing, using a computer processor, a correlation using first data elements of the identified first seed attributes and second data elements of the identified second seed attributes, including to compute a respective weight of the correlation for the first dimensions with respect to the second dimensions, creating, using the computer processor, a set of mergeable first and second dimensions based on the computed correlation weights and creating, using the computer processor, a set of non-mergeable first and second dimensions based on the computed correlation weights;
   iteratively identifying, using the computer processor, one or more attributes from the set of non-mergeable first and second dimensions and amending the created set of mergeable first and second dimensions with the identified one or more attributes from the set of non-mergeable first and second dimensions based on a cohesiveness characteristic; and
   forming, using the computer processor, a merged dataset as output as a representation including non-trivial similarities between the first and second datasets, the merged dataset based on the amended set of mergeable first and second dimensions.

13. The method of claim 12, wherein the cohesiveness characteristic incorporates a first silhouette score of the data elements of the first dataset and a second silhouette score of the data elements of the second dataset.

14. The method of claim 13, wherein the first silhouette score represents data cohesions in the first dataset and the second silhouette score represents data cohesions in the second dataset.

15. The method of claim 13, wherein amending the created set of mergeable first and second dimensions further comprises re-computing, using the computer processor, the first silhouette score and the second silhouette score.

16. The method of claim 14, further comprising concluding, using the computer processor, the iterative amendment of the set of mergeable first and second dimensions when a combination of the first and second silhouette scores attains a mean of the first and second silhouette scores.

17. The method of claim 12, wherein the amendment of the set of mergeable attributes includes adding, using the computer processor, the identified one or more attributes from the set of non-mergeable first and second dimensions to the created set of mergeable first and second dimensions.

18. The computer system of claim 1, wherein the correlation manager configured to compute a respective weight of correlation for the first dimensions with respect to the second dimensions comprises the correlation manager configured to calculate a respective correlation value for each of the first dimensions with respect to each of the second dimensions, to sum the calculated correlation values to provide a total correlation value, and to calculate the respective weight of correlation based on the respective correlation value and the total correlation value.

19. The computer program product of claim 6, wherein the program code executable by the processor to compute a respective weight of correlation for the first dimensions with respect to the second dimensions comprises program code executable by the processor to calculate a respective correlation value for each of the first dimensions with respect to each of the second dimensions, to sum the calculated correlation values to provide a total correlation value, and to calculate the respective weight of correlation based on the respective correlation value and the total correlation value.

20. The method of claim 12, wherein the computing a respective weight of correlation for the first dimensions with respect to the second dimensions comprises calculating a respective correlation value for each of the first dimensions with respect to each of the second dimensions, summing the calculated correlation values to provide a total correlation value, and calculating the respective weight of correlation based on the respective correlation value and the total correlation value.

\* \* \* \* \*